Jan. 7, 1964     E. D. MARADYN     3,116,956
TRACK ASSEMBLY FOR ENDLESS TRACK VEHICLE
Filed Jan. 4, 1962     5 Sheets-Sheet 1

INVENTOR
EDWARD D. MARADYN

Jan. 7, 1964 E. D. MARADYN 3,116,956
TRACK ASSEMBLY FOR ENDLESS TRACK VEHICLE
Filed Jan. 4, 1962 5 Sheets-Sheet 2

INVENTOR
EDWARD D. MARADYN
By Emory L. Groff Jr.
Atty

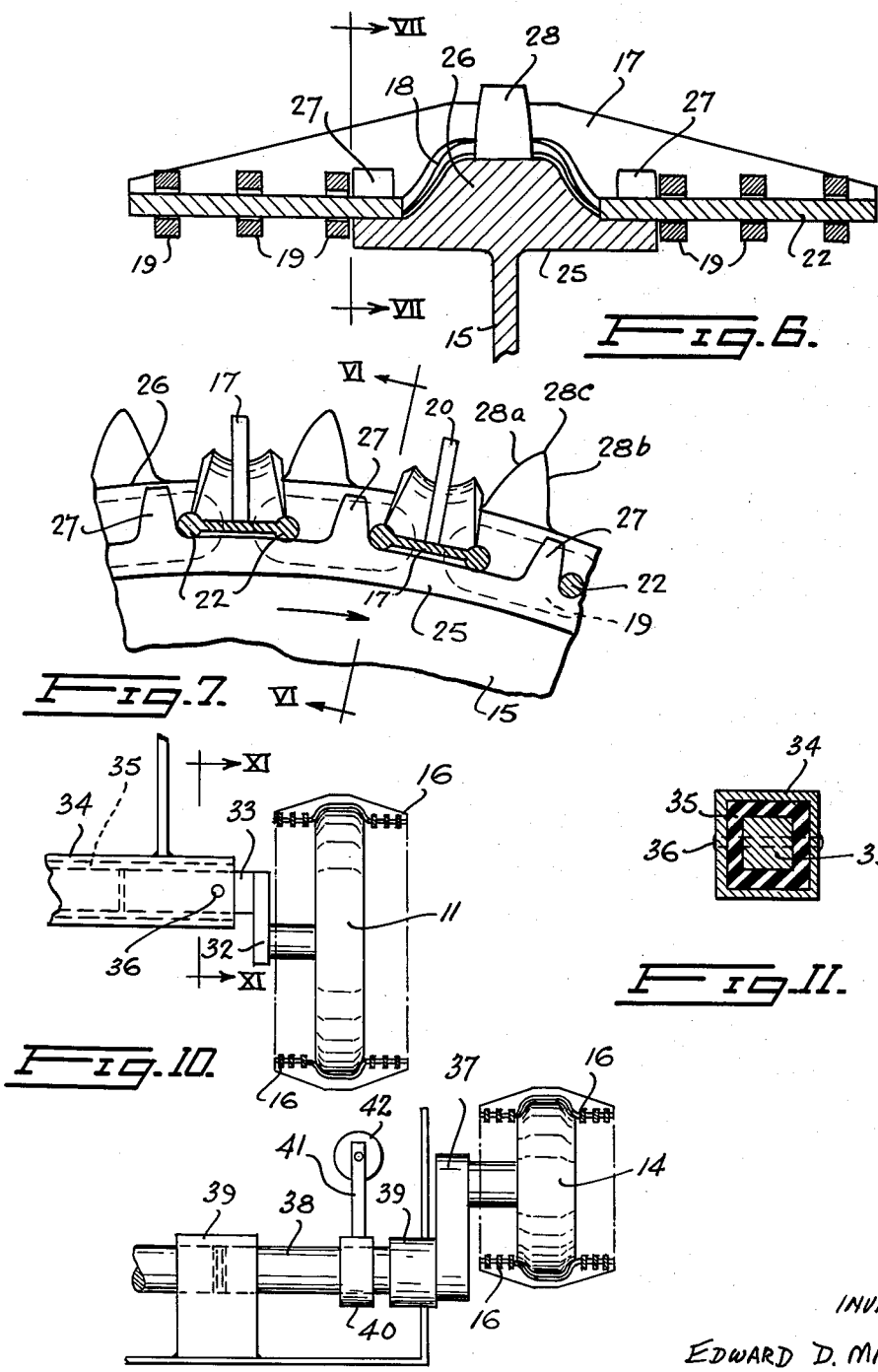

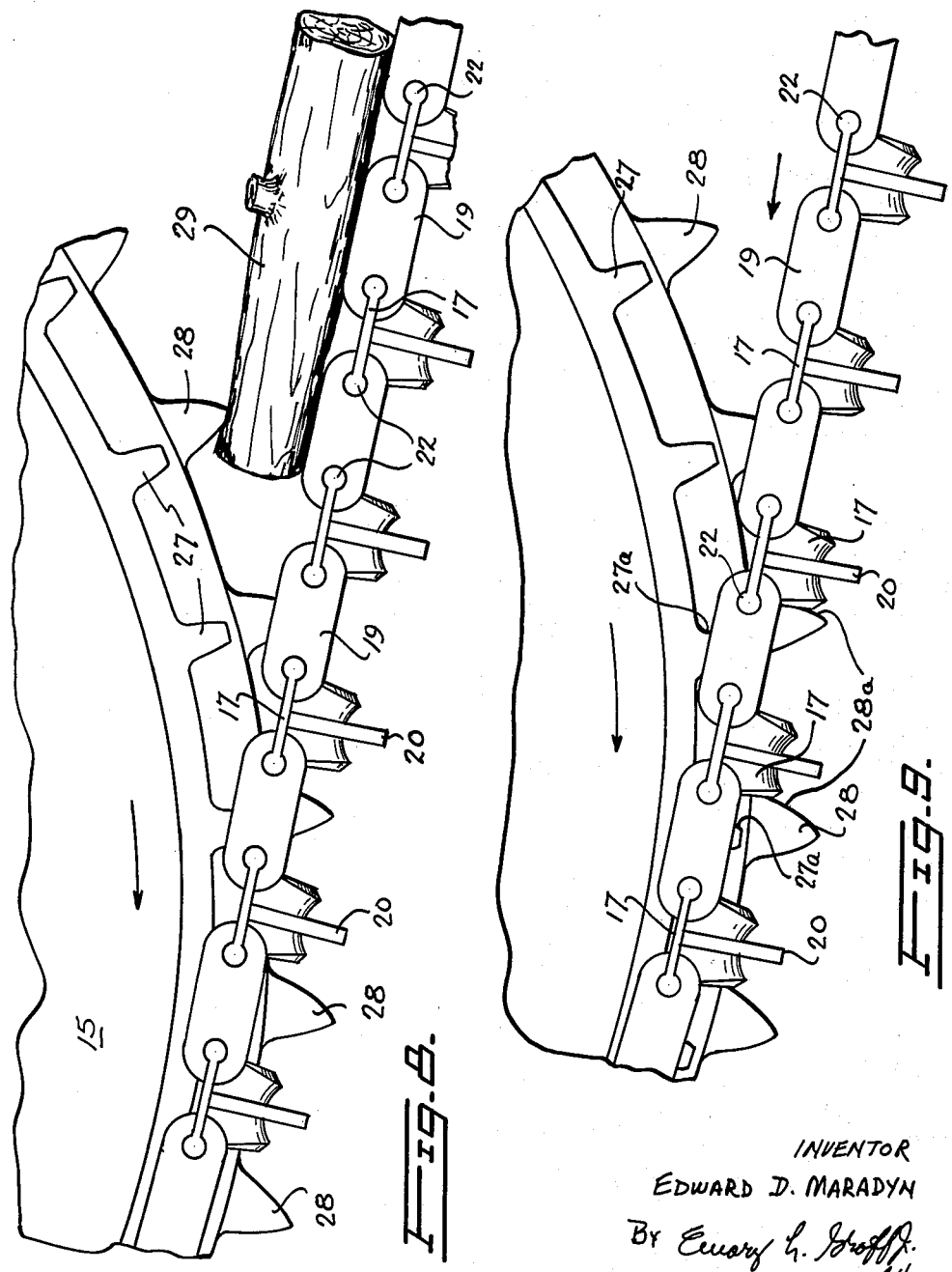

Jan. 7, 1964    E. D. MARADYN    3,116,956
TRACK ASSEMBLY FOR ENDLESS TRACK VEHICLE
Filed Jan. 4, 1962    5 Sheets-Sheet 5

INVENTOR
EDWARD D. MARADYN
By Emory L. Groff
Atty

United States Patent Office 3,116,956
Patented Jan. 7, 1964

3,116,956
TRACK ASSEMBLY FOR ENDLESS
TRACK VEHICLE
Edward D. Maradyn, Fort William, Ontario, Canada, assignor to The Northern Engineering & Supply Co.,
Limited, Fort William, Ontario, Canada
Filed Jan. 4, 1962, Ser. No. 164,268
Claims priority, application Canada Dec. 16, 1961
4 Claims. (Cl. 305—11)

This invention relates to improvements in the construction of track assemblies for use on endless track vehicles.

More particularly the invention is concerned with the provision of improved track assemblies especially suitable for use on vehicles that are intended to travel over rough or undeveloped country. Such vehicles may encounter deep snow, muskeg, muddy, swampy or otherwise insecure terrain into which there is a tendency for the vehicle to sink under its own weight. One of the objects of the present invention is to provide track assemblies that are able to give the vehicle adequate "flotation" when travelling over such terrain, that is to say the ability to keep the vehicle at or near the surface and avoid its tendency to sink deeply into soft ground. This requirement necessitates a large area of load bearing contact with the ground. Since the length of each track assembly that is in contact with the ground and is largely determined by other factors, principally the length of the vehicle, the need for a large contact area automatically introduces a need for a wide track.

It is thus an object of the invention to provide an improved form of wide track assembly.

When a wide track is used, it becomes important to ensure a substantial measure of transverse flexibility. When operating on hard ground, one edge of a wide track may encounter a local projection, such as a rock, while the other edge remains on flat ground. The wider the track, the more likely is such an occurrence, and the more important flexibility becomes. Moreover, the forward end of the track may encounter a different transverse slope from the rear end of the track.

It has previously been proposed to solve this problem by constructing a wide track of cross bars joined together along each edge of the track by a band of hard but flexible rubber, and mounting such track so that only its central portion engages the vehicle-supporting wheels, while its two edges project laterally to each side of such wheels. The freedom to pivot about the wheels thus achieved adds to the inherent flexibility of the rubber and furnishes the track with the ability to lie comparatively uniformly on ground which has one or more local projections or other irregularities.

On the other hand, the use of rubber is generally undesirable, as the nature of the material is such that some stretching inevitably takes place, resulting in the track losing tension in the longitudinal direction. Not only is it undesirable to have to adjust the take-up roller frequently to compensate for this stretching, but, eventually the spacing between the cross bars becomes so increased that the track will not engage properly with a driving sprocket.

The primary object of the present invention is thus to provide a track assembly that yields substantially the same advantages as those of a wide rubber track, namely the "flotation" effect of a large surface in contact with the ground, and the ability to flex readily around local obstructions, while at the same time avoiding the tendency to stretching inherent in rubber. This requirement is achieved by providing an assembly that is rigid in respect of longitudinal elongation. Instead of employing continuous side bands, groups of individual but rigid (steel) links are used to interconnect the cross bars (grouser bars), these links being loosely hinged to the lateral edges of the grouser bars in a manner that maintains rigidity as far as refusal to stretch under longitudinal tension is concerned, but introduces substantial flexibility, as far as freedom to twist locally about a longitudinal axis is concerned.

One manner in which this result can be achieved is illustrated by way of example only in the accompanying drawings.

In these drawings:

FIGURE 6 is a section on the line VI—VI in FIGURE 1 showing the driving sprocket;

FIGURE 7 is a section on the line VII—VII in FIGURE 6;

FIGURE 8 is a fragmentary view showing the portion of the track just coming into engagement with the lower periphery of the drive sprocket, as seen from the side of the vehicle (similarly to FIGURE 1), and demonstrating the effect of a log becoming entangled with this part of the mechanism;

FIGURE 9 is a view similar to FIGURE 8 showing the effect of the vehicle turning sharply when the track on the side illustrated may tend to run forward on the sprocket;

FIGURE 10 is a diagrammatic view of the manner of mounting a load-supporting idler wheel;

FIGURE 11 is a section on the line XI—XI in FIGURE 10;

FIGURE 12 is a diagrammatic view of the manner of mounting a takeup idler, seen generally on the line XII—XII in FIGURE 1;

Figure 1:
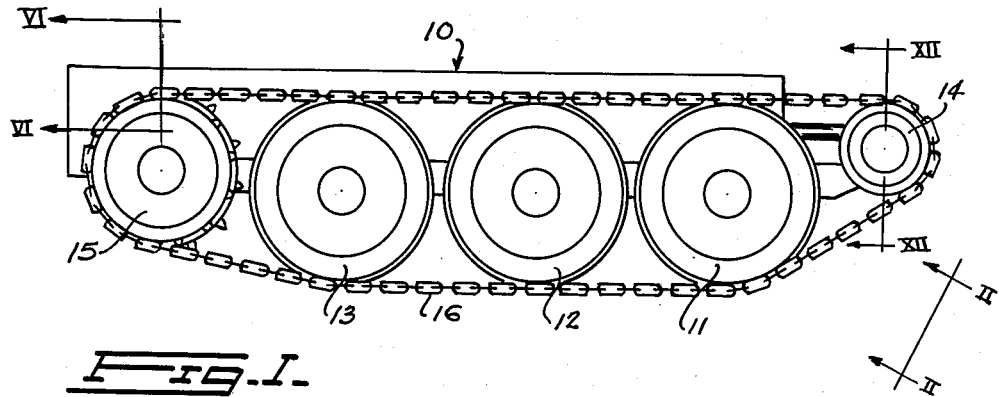
FIGURE 1 shows a diagrammatic view of one side of a vehicle, demonstrating the general manner of mounting thereon a track assembly according to the invention.
Figure 2:
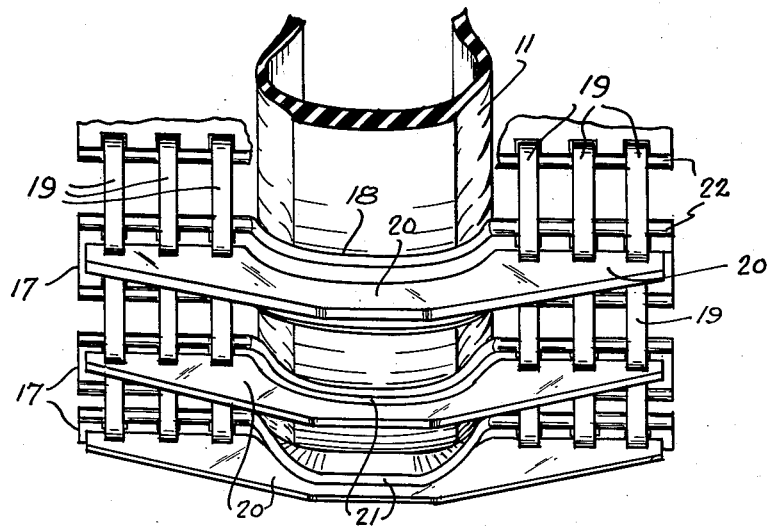
FIGURE 2 is a view of a fragment of the track assembly and a load-supporting wheel, seen on the line II—II in FIGURE 1.
Figure 3:
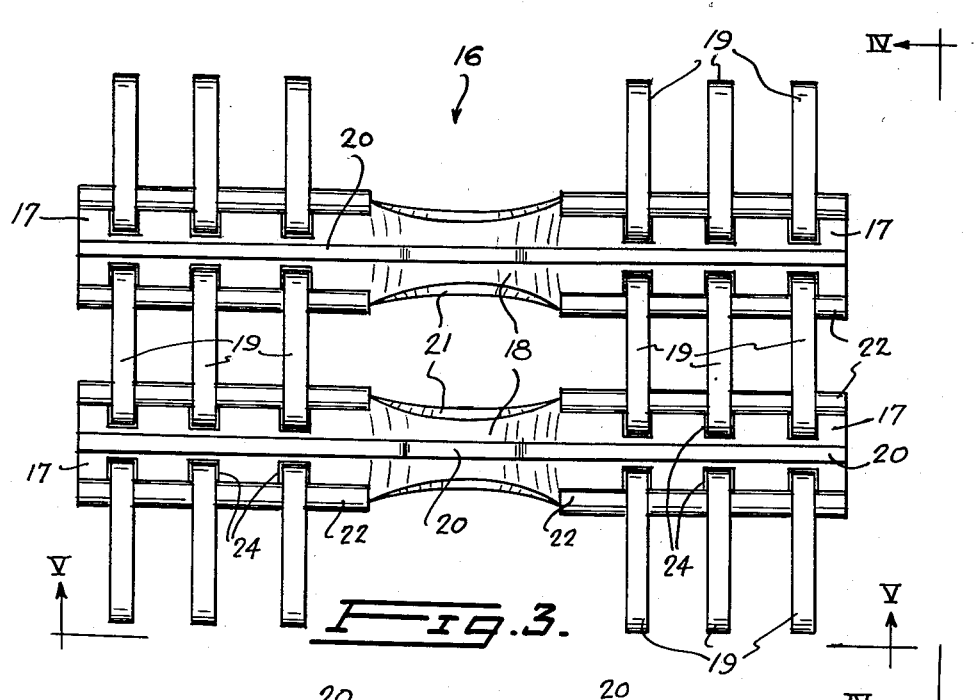
FIGURE 3 is a plan view of a portion of such track assembly, separated from the vehicle.
Figure 4:
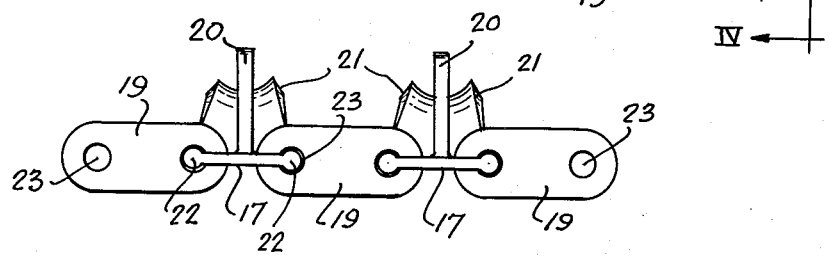
FIGURE 4 is a view on the line IV—IV in FIGURE 3.
Figure 5:
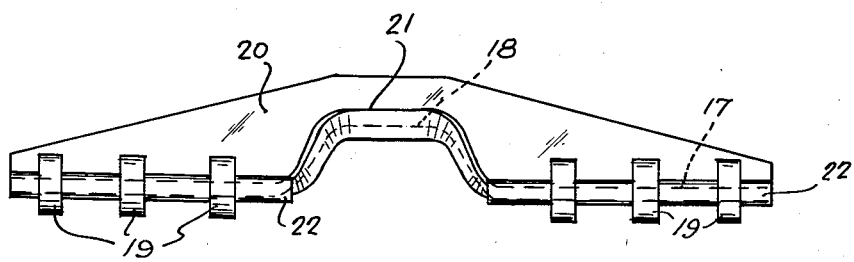
FIGURE 5 is a view on the line V—V in FIGURE 3.

The vehicle 10 of FIGURE 1 shows one side of a typical endless track vehicle. It is to be understood that the present invention, which relates to the track assembly and its cooperation with the driving and supporting wheels, rather than the vehicle, is equally applicable to other vehicle constructions and to other arrangements of supporting and driving wheels. The arrangement of FIGURE 1 is provided merely as an example of one vehicle to which a track assembly according to the invention may conveniently be applied. Wheels 11, 12 and 13, which include pneumatic tires (but could have solid rubber or metal rims), are load-supporting idler wheels; wheel 14 is a front take-up idler mounted for maintaining tension in the track in a manner later described; and, at the rear, wheel 15 is a driving sprocket for propelling the vehicle. The manner in which the sprocket 15 engages the track assembly 16 is also described fully below. This arrangement is repeated on the remote side of the vehicle.

The structure of the track assembly 16 is best appreciated from FIGURES 2 to 5, and will be seen to consist of a series of spaced apart, parallel, steel grouser bars 17, adjacent pairs of which are joined together on each side of a central portion 18 by a group of three steel links 19. The central portion 18 is arched to embrace the tire of each of the wheels 11 to 14 in turn, as seen in connection with wheel 11 in FIGURE 2, and, on the outer surface of the base plate of each grouser bar 17 there is formed a perpendicularly projecting plate or "strong back" member 20 which tapers down toward each end of the bar from a high area over the arched central portion 18 thus presenting a generally convex face to the ground (see FIGURES 2 and 5). On each side of the member 20, the edges of the base plate of the bar 17 at the central arched portion 18 are turned up to form flanges 21 flanking the strong back member 20 for added strength and ground gripping properties.

Welded to each lateral edge of each of the end portions of the bar 17 which extend longitudinally outwardly of the central portion 18 are hinge pins in the form of rods 22 that project through holes 23 in the ends of the links 19. As best seen from FIGURE 4, the rods 22 are a loose fit in holes 23 to permit the links 19 some freedom to twist relative to the grouser bars 17 about an axis extending longitudinally along the track, that is at right angles to the axes of the rods 22 about which the main pivoting (hinging) of the links takes place. Slots 24 (FIGURE 3) in the grouser bars 17 accommodate the ends of links 19.

The driving sprocket 15 (FIGURES 6 and 7) supports a drum portion 25 including a central, projecting guide section 26 which has a smooth outer periphery that under normal conditions lies with a small clearance within the arched central portion 18 of a grouser bar 17 of the track assembly. Projecting from the drum portion 25 on each side of the guide section 26 is a set of sprocket teeth 27 that engage the rods 22 of the grouser bars. In addition, projecting from the centre of the guide section 26 itself are guide teeth 28 arranged around the periphery of the guide section in positions such that these teeth normally project into the spaces between grouser bars 17 without touching such bars. This normal running condition in which the sprocket 15 is assumed to be driving against the track is shown in FIGURES 6 and 7. It will be observed that clockwise rotation of sprocket 15 keeps teeth 27 tight up against the rods 22 ahead of it, and that there is a gap between the trailing edge of each tooth 27 and the rod 22 immediately behind it. This spacing or backlash is desirable for proper running of the track under all conditions. Note that centering of the track on the sprocket is in large measure determined by the links 19 bearing on the edges of the drum portion 25, as best seen in FIGURE 6.

Two abnormal conditions are illustrated respectively in FIGURES 8 and 9, both of which figures show a fragmentary view of the portion of the track that is just coming into engagement with the lower periphery of the sprocket 15.

FIGURE 8 shows normal driving conditions, but with a log 29 in position to enter the closing jaws that the track and sprocket here constitute. In working over rough ground in logging operations, stones and small logs will frequently be thrown up into the upper surface of the lower span of the track. When these lodge on the sides of the track, they merely fall off when the track is inverted on passing around the drive sprocket. Indeed, the use of the separate links 19 instead of solid bands along the edges of the track, tends to encourage most foreign objects falling through soon after they are thrown up onto the track.

Perhaps the worst condition likely to be encountered is a log thrown up so as to lie longitudinally along the centre of the track in the manner of log 29 in FIGURE 8. A log lying transversely of the track (that is parallel to the grouser bars) will normally roll free as the track moves up into engagement with the sprocket, but this is not necessarily so in the case of a log lying longitudinally. Although the throwing up of a log into this position is unlikely to occur with great frequency, it can happen often enough to represent a serious nuisance. When it does happen, a breakage or at least a stoppage will result.

This problem is, to a large extent, ameliorated by the present design of sprocket wheel in which the teeth 28 are the most projecting portions. These teeth are preferably shaped as shown with an involute trailing surface 28a and a more closely perpendicular leading surface 28b, the two surfaces meeting at a point 28c. In the situation visualized in FIGURE 8, the point 28c of the tooth 28 which is about to engage the log 29 can be expected to split the log or force it to one side. Thus, under these circumstances, these so-called guide teeth 28 perform a log splitting or dislodging function. As a minor variant of this function, the teeth 28 will also act to punch-out any small obstructions (log chips or stones) that have become lodged between a pair of grouser bars. Obviously many slightly different such situations can arise, and, in connection therewith, the function of the teeth 28 can be summed up generally as that of dislodging foreign objects from the central part of the track as it passes around the driving sprocket.

The guiding function of the teeth 28, from which they derive their name, is illustrated in FIGURE 9. This view shows what happens when the track tries to drive the sprocket, as tends to occur on the inside track assembly when the vehicle is turning sharply. The track slips forward to take up the backlash, although there will normally still be some continued forward motion of both sprocket and track. In other words, the track continues to keep coming up onto the sprocket, although the direction of transfer of power between the parts has been temporarily reversed. The tendency when this happens is for the rods 22 to try to ride up on the trailing surfaces 27a of the main sprocket teeth immediately ahead of them. There would be danger of the rods 22 achieving this result sufficiently to slip over the teeth 27, if it were not for the simultaneous contact that arises between the leading edge of the grouser bar 17 that is next to engage the sprocket, and the trailing surface 28a of the guide tooth 28 that is positioned at this point of the periphery of the sprocket. As FIGURE 9 demonstrates, the teeth 28 project sufficiently to ensure that no such forward slipping of the track can take place. The teeth 28 can thus be said to perform a guiding function in that they guide the track properly as it comes onto the sprocket, under the difficult circumstances that pertain when the direction of power transfer between sprocket and track becomes temporarily reversed. Note that this is not the same as driving the vehicle in reverse, the direction of motion is still forward. When the vehicle is driven in reverse, the track feeds on to the sprocket at the top.

As will be apparent from FIGURE 9, the criterion for this function to be effective is that the trailing edge 28a of the guide tooth is in the correct position to engage the leading edge of the grouser bar. The position of the grouser bar is determined by the position of the trailing edge of the next tooth 27, and consequently the circumferential relationship between each tooth 27 and its associated tooth 28 can be determined. They will tend normally to be generally aligned. In the example illustrated the trailing edge 28a is positioned somewhat circumferentially behind the trailing edge of the associated tooth 27, having regard to the direction of rotation, because the part of the grouser bar that bears against the edge 28a is behind the rod 22 which bears against the trailing edge of tooth 27. This is due to the general taper of the grouser bar construction when viewed end on, as in FIGURE 9. If the grouser bar construction were different in this regard, then the relative circumferential positioning of the teeth 27 and 28 would require consequent revision. It is reasonable to say, however, that the respective trailing edges are "generally" aligned with each other, the deviation from exact alignment being such as to cater to the difference in extent of forward projection between the two areas of a grouser bar that bear against these respective trailing edges.

A convenient manner of mounting a typical load-supporting idler wheel 11 is illustrated in FIGURES 10 and 11. The wheel 11 is freely pivoted about its axis on a depending arm 32 that is, in turn, supported from a horizontal arm 33 of square cross section which is mounted in a square housing 34 that forms part of the vehicle frame. Rubber 35 is tightly packed in between parts 33 and 34 and the assembly is kept in place by a pin 36. This method of mounting is simple and convenient and has been found satisfactory in practice when a wheel having a pneumatic tire is used.

Figure 13:
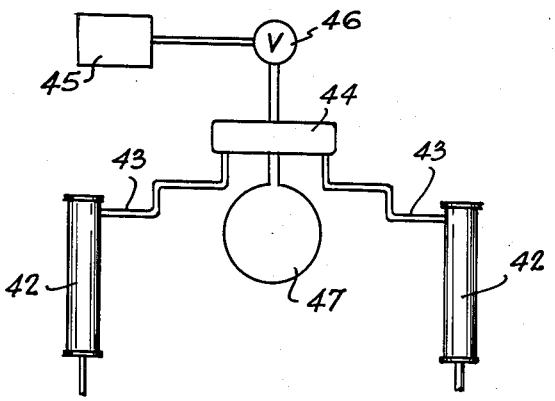
FIGURE 13 is a diagram illustrating the hydraulic system for the take-up idlers.

The preferred manner of controlling the tension in the track assemblies on each side of the vehicle is by means of take-up rollers 14 that are each freely rotatably mounted on a crank arm 37 (FIGURE 12) connected to a shaft 38 mounted in bearings 39 in the vehicle frame. In this manner the axis of the take-up roller is made eccentric in relation to the axis of shaft 38. Rotation of the latter is controlled by a collar 40 secured to the shaft and carrying arm 41 to which the piston rod of an hydraulic cylinder 42 is connected. As FIGURE 13 shows, the two cylinders 42 are connected through pressure lines 43 to a junction 44 to which hydraulic fluid under pressure is fed from pump 45 through valve 46. An accumulator 47 is also connected to the fluid system at the junction 44. This accumulator may conveniently be of the type including some trapped gas that can be compressed to absorb pressure shocks in the system. Thus, if one of the take-up rollers 14 is suddenly exposed to an excessive rearward force, it can yield, the hydraulic system and particularly the accumulator absorbing the shock. The common connection of the two cylinders 42 to the same system tends to cause the one not subjected to excess external force to tighten the pressure it exerts on its associated track assembly when such force is experienced. The operation control is exercised over the valve 46 to increase or decrease the general system pressure and hence increase or decrease the tension in the track assemblies.

One way of assembling a straight strip of the track into an endless assembly is to terminate the strip at one end in a pair of rods 22 and at the other end in a grouser bar lacking a pair of rods 22. Welding the rods from the first end to the grouser bar of the second end then completes the endless assembly. Obviously other ways of connecting up the track or of securing the rods to the grouser bars are possible.

Figure 14:
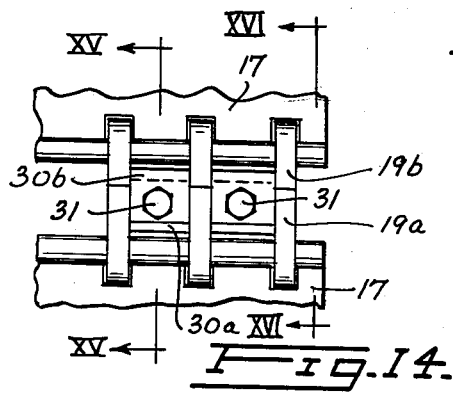
FIGURE 14 is a fragmentary plan view of a modified track assembly.
Figure 15:
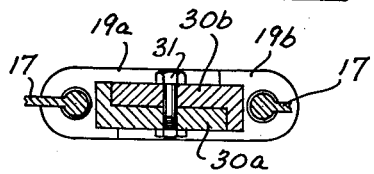
FIGURE 15 is a section on the line XV—XV in FIGURE 14.
Figure 16:
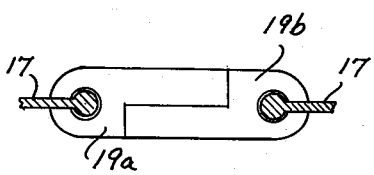
FIGURE 16 is a view on the line XVI—XVI in FIGURE 14.

An alternative manner of connecting up a strip of track is illustrated in FIGURES 14 to 16. Here, between one adjacent pair of grouser bars 17, the links are each formed in two separate parts 19a and 19b, and between the links and secured thereto are lugs 30a and 30b bolted together by bolts 31. Lugs 30a are secured to links 19a and lugs 30b are secured to links 19b, and the parts slide together so that the bolts 31 are not called upon to be stressed in tension to hold the assembly together.

It will be convenient at this stage to list the advantageous features of the construction illustrated.

(A) The track assembly is driven and supported by a series of wheels 11 to 15 lying all in the same plane, with which plane the longitudinal centre of the track assembly is aligned. Side-by-side wheels are avoided, and yet a wide track is used.

(B) The wide track is supported centrally by comparatively narrow supporting wheels 11 to 13 and can thus pivot bodily about its longitudinal central axis to accommodate major topographical features of the terrain, such as a continuous traverse slope. On the other hand the track is supported at its ends by wider wheels (sprocket 15 and take-up roller 14) that substantially preclude bodily pivoting of the track. This ensures overall stability.

(C) The two, spaced-apart sets of driving teeth 27 on the sprocket 15 ensure that at least one set of teeth will continue to drive even if, exceptionally, a small amount of bodily pivoting takes place, a possibility more likely to arise just as the track feeds onto the sprocket.

Figure 17:
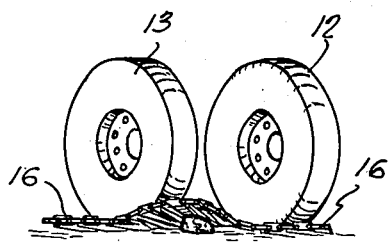
FIGURE 17 is a perspective view of a portion of the track assembly of the preceding figures, demonstrating the manner in which the track can flex around an obstruction.

(D) In addition to the bodily pivoting, the track assembly is particularly well adapted for local flexing to accommodate the track to minor topographic irregularities, such as tree stumps and rocks (see FIGURE 17).

(E) The track assembly can bend and twist substantially as well as a track using rubber side bands, and yet it is not subject to any significant longitudinal stretching, because the links joining the grouser bars are metallic. Maintenance of the required pitch between grouser bars is ensured, and the main disadvantage of rubber tracks is thus avoided.

(F) The ability to acommodate minor irregularities of terrain by local twisting reduces the risk of the track coming off as a result of excess bodily pivoting.

(G) This ability to bend and twist simultaneously is in large part due to the method of connecting the grouser bars together on each side of the longitudinal center of the track by means of a plurality (a group) of separate links. If a single link were used on each side, it would have to be larger and heavier than those now employed, and less convenient. By dividing the load between more than one link on each side, a more flexible construction is obtained. Although it is preferred to use at least three links, as shown, an acceptable result could be obtained with two links on each side. Similarly four or more links per group could be used. Another important aspect contributing to the flexibility of the assembly is the loose connection of the links around the rods 22 that are welded to the edges of the grouser bars.

(H) Each of the grouser bars 17 presents a convex surface to the ground by virtue of the tapered shape of the strong back member 20. Thus, on hard ground, the track supports the vehicle on the narrow central section of the track directly under the supporting wheels 11 to 13 thus facilitating pivoting and flexing to accommodate terrain irregularities. On the other hand, on soft ground, the vehicle will normally be supported by the full, wide width of the track. In addition to providing excellent "flotation" characteristics on very soft ground, the employment of a large track width increases traction on slippery soft ground.

(I) Traction on soft ground is also improved by the use of separate links between the grouser bars. Such links engage the ground more positively than would a full plate extending between the grouser bars. While the grouser bars perform an anti-slip function against slopes in the direction of travel, the links 19 perform the same function in protecting against sliding sideways on a transverse slope. Use of separate links also allows soil to fall through the track assembly and not build up on top of the track.

(J) Large diameter supporting wheels 11, 12 and 13 are used and these also act as supports for the upper span of the track.

(K) The construction of sprocket 15, providing the guide teeth 28 additional to the driving teeth 27, materially assists the correct guiding of the track as it feeds into the sprocket, especially under conditions of reverse power transfer.

(L) The teeth 28 also serve the valuable function of assisting clearance of foreign objects from on top of the track or from between a pair of grouser bars, along the central portion of the track.

(M) The load-supporting idler wheels 11 to 13 are mounted in a simple yet effective manner.

(N) Each take-up idler is eccentrically mounted for modifying the track tension, and is controlled by an hydraulic system including an accumulator for absorbing pressure shocks. The two hydraulic cylinders for the respective take-up idlers are connected together for pressure equalization.

The many advantages and novel features enumerated above, although all present in the example of the invention illustrated, may not necessarily all be present in alternative constructions that embody essentially the same basic inventive improvements. The scope of the present invention thus extends beyond the specific construction illustrated and is limited only by the claims that follow.

I claim:

1. The combination of a track assembly and a driving sprocket for engaging said track assembly,
   (a) the track assembly comprising
      (i) a plurality of grouser bars each extending across the track assembly and arranged parallel to each other in spaced apart relation along the track assembly,
      (ii) and a plurality of rigid links interconnecting said grouser bars,
   (b) the driving sprocket comprising
      (iii) at least one set of radially projecting driving teeth extending circumferentially around the periphery of the sprocket, said teeth being spaced apart to define between them circumferentially extending sprocket surfaces wider than the width of the grouser bars,
      (iv) a guide section displaced axially from said set,
      (v) and a set of radially projecting guide teeth extending circumferentially around said guide section, said guide teeth projecting radially beyond the driving teeth,
      (vi) the relative positioning of the guide and driving teeth being such that, during normal forward driving with power transfer from sprocket to track assembly, said driving teeth each engage a grouser bar and said guide teeth project between grouser bars out of normal contact therewith, and, during checked forward driving with power transfer from track assembly to sprocket, the track assembly slides forward with said grouser bars sliding on said sprocket surfaces to come to bear with a first part of each grouser bar against a respective driving tooth and with a second part of each grouser bar against a respective guide tooth.

2. The combination of a track assembly and a driving sprocket for engaging said track assembly,
   (a) the track assembly comprising
      (i) a plurality of grouser bars each extending across the track assembly and arranged parallel to each other in spaced apart relation along the track assembly,
      (ii) and a plurality of rigid links interconnecting said grouser bars,
      (iii) said links being arranged in groups of at least two mutually parallel links, each group interconnecting a respective pair of adjacent grouser bars on a respective side of the track assembly,
      (iv) said links being loosely hinged to said grouser bars about a hinge axis transverse of the track assembly with freedom to twist about an axis longitudinal of the track assembly
   (b) the driving sprocket comprising
      (v) at least one set of radially projecting driving teeth extending circumferentially around the periphery of the sprocket, said teeth being spaced apart to define between them circumferentially extending sprocket surfaces wider than the width of the grouser bars,
      (vi) a guide section displaced axially from said set,
      (vii) and a set of radially projecting guide teeth extending circumferentially around said guide section, said guide teeth projecting radially beyond the driving teeth,
      (viii) the relative positioning of the guide and driving teeth being such that, during normal forward driving with power transfer from sprocket to track assembly, said driving teeth each engage a grouser bar and said guide teeth project between grouser bars out of normal contact therewith, and, during checked forward driving with power transfer from track assembly to sprocket, the track assembly slides forward with said grouser bars sliding on said sprocket surfaces to come to bear with a first part of each grouser bar against a respective driving tooth and with a second part of each grouser bar against a respective guide tooth.

3. A track assembly for an endless track vehicle, comprising
   (a) a plurality of rigid grouser bars each extending across the track assembly and arranged parallel to each other in spaced apart relation along the track assembly, each grouser bar having
      (i) an elongated steel base plate having an arched central portion for embracing the periphery of at least one load-supporting wheel and for embracing a guide portion of a driving sprocket,
      (ii) a "strong back" member projecting perpendicularly from said base plate and extending along the longitudinal center thereof, said member presenting an outer face of generally convex form to the ground with the most projecting portion of said member underlying said arched central portion,
      (iii) the edges of said base plate at the central portion thereof being turned up to form flanges flanking the strong back member and providing additional ground gripping surfaces,
      (iv) end portions extending on each side of said central portion, and rods secured to both lateral edges of each of said end portions, such rods constituting hinge pins,
   (b) and a plurality of rigid links interconnecting said grouser bars,
      (v) said links being arranged in groups of at least two mutually parallel links, the links of each group having holes encircling the adjacent hinge pins of a pair of adjacent grouser bars on a respective side of said central portion to hinge each link to each grouser bar about an axis transverse of the track assembly,
      (vi) and said link holes being oversize for said hinge pins to permit the links a degree of freedom to twist about an axis longitudinal of the track assembly.

4. A track assembly for an endless track vehicle, comprising
   (a) a plurality of rigid grouser bars each extending across the track assembly and arranged parallel to each other in spaced apart relation along the track assembly, each grouser bar having
      (i) an arched central portion for embracing the periphery of at least one load-supporting wheel and for embracing a guide portion of a driving sprocket,
      (ii) end portions extending on each side of said central portion,
      (iii) rods secured to both lateral edges of each of said end portions, such rods constituting hinge pins,
      (iv) said rods being positioned for engagement with respective sets of teeth provided on said driving sprocket on opposite sides of said guide portion of said sprocket,
      (v) and a member extending along the bar presenting an outer face of generally convex form to the ground with the most projecting portion of said member underlying said arched central portion, (b) and a plurality of rigid links interconnecting said grouser bars, (vi) said links being arranged in groups of at least two mutually parallel links, the links of each group having holes encircling the adjacent hinge pins of a pair of adjacent grouser bars on a respective side of said central portion to hinge each link to each grouser bar about an axis transverse of the track assembly, (vii) and said link holes being oversize for said hinge pins to permit the links a degree of freedom to twist about an axis longitudinal of the track assembly.

References Cited in the file of this patent

UNITED STATES PATENTS

| | | |
|---|---|---|
| 1,495,708 | Matteson | May 27, 1924 |
| 1,835,627 | Bauer | Dec. 8, 1931 |
| 1,924,161 | Knox | Aug. 29, 1933 |
| 2,389,624 | Knox et al. | Nov. 27, 1945 |
| 2,673,471 | Kline et al. | Mar. 30, 1954 |
| 2,706,663 | Heckerman | Apr. 19, 1955 |
| 2,714,820 | Chamberlain | Aug. 9, 1955 |
| 2,837,379 | Selyem et al. | June 3, 1958 |
| 2,893,787 | Nodwell | July 7, 1959 |
| 2,999,723 | Ostberg et al. | Sept. 12, 1961 |
| 3,013,843 | Sinko | Dec. 19, 1961 |

FOREIGN PATENTS

| | | |
|---|---|---|
| 687,438 | Great Britain | Feb. 11, 1953 |